United States Patent [19]

Cheng

[11] Patent Number: 4,662,103

[45] Date of Patent: May 5, 1987

[54] DRIPPING EVAPORATION TYPE OF INSECT LURING DEVICE

[76] Inventor: Lung-Shiung Cheng, No. 17, Lane 125, Sec. 3, San-Ho Rd., Sanchung City, Taipei Hsien, Taiwan

[21] Appl. No.: 744,736

[22] Filed: Jun. 14, 1985

[51] Int. Cl.[4] .............................................. A01M 1/20
[52] U.S. Cl. ..................................... 43/131; 43/132.1
[58] Field of Search ................... 43/2, 129, 131, 132.1

[56] References Cited

U.S. PATENT DOCUMENTS

| | | | |
|---|---|---|---|
| 1,129,897 | 3/1915 | Owen | 43/131 |
| 1,866,658 | 7/1932 | Lichtig | 43/131 |
| 2,004,121 | 6/1935 | Loibl, Jr. | 43/131 |
| 2,606,391 | 8/1952 | McGrew | 43/131 |
| 2,959,354 | 11/1960 | Beck | 43/2 |

Primary Examiner—Nicholas P. Godici
Assistant Examiner—Christopher L. McKee
Attorney, Agent, or Firm—Lane and Aitken

[57] ABSTRACT

A dripping evaporation type of insect luring device which is operated by putting the insecticide container inside a base assembly having framework including a strut ending in a support bar over which an insecticide container is inverted onto a cork base. By permeating the insecticide into the cork base, which is supported by the strut of the base assembly, this insect luring device is highly advantageous for dispersing the smell of the insecticide into the nearby atmosphere.

5 Claims, 3 Drawing Figures

DRIPPING EVAPORATION TYPE OF INSECT LURING DEVICE

BACKGROUND OF THE INVENTION

The commonly used insect luring device is a cotton pad patch soaked with insecticide which has a strong smell that is able to attract and kill moths and insects. After soaking, the patches are hung around the field. Being attracted by the smell evaporating from the cotton pad which was soaked with insecticide, fruit flies, melon flies, and other insects will come near and perch on the patch, whereupon the insecticide will kill these insects.

The defects of this traditional type of insect luring device are: (1) Handling this cotton pad soaked with insecticide will contaminate bare hands, which is hazardous and can cause serious health problems. (2) The cotton pad soaked with insecticide is inconvenient to handle and, of course, it has an unattractive appearance. (3) On sunny days, the patch will quickly dry out and, on rainy days, the insecticide will be quickly washed out of the patch by the rain. (4) The longest effective period of this known insecticide device is around two weeks.

A dripping evaporation type of insect luring device constructed in accordance with the present invention does not have these defects.

SUMMARY OF THE INVENTION

This invention is a dripping evaporation type of insect luring device. Its insecticide container is installed on a strut in the base assembly. The strut holds the insecticide container which releases insecticide onto the base plate. As the released insecticide sends a smell into the area nearby the lure, fruit flies, melon flies and other insects in the surrounding area come into this luring and the insecticide in the device kills the incoming insects on the spot. The base plate is protected by an enclosure that prevents it from being exposed to the sunlight and rain, thus extending the service life of the insecticide, and the device prevents hand contamination, thus protecting the end-users. Its attractive appearance, safety and extended service life are advantageous features of this invention.

DETAILED DESCRIPTION

This invention is a dripping evaporation-type insect luring device which comprise an enclosure assembly and a base assembly that provide protection from sunlight and rain. It also has a wooden base plate that increases the surface area over which the insecticide spreads, thus extending the service life of this device to a period of two months.

Figure 1:
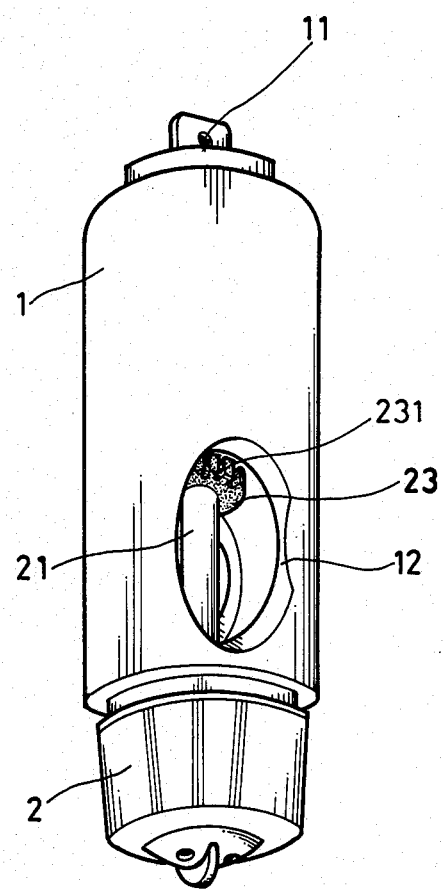
FIG. 1 is a perspective drawing of apparatus in accordance with this invention.

With reference first to FIG. 1, the device shown comprises an enclosure 1 and a base assembly 2. In an upper extension of the enclosure assembly 1, there is a hole 11 used for fixing the entire device in a convenient location using a rope. At the middle part of the enclosure assembly 1, there is a big ventilation opening 12 used for spreading the smell of the insecticide into the nearby atmosphere as the insecticide evaporates and thus luring the fruit flies, melon flies and other insects into the device, killing these insects. As the fruit flies, melon flies and other insects enter and get killed inside this device, the ventilation opening 12 will become blocked by these dead insects if they are allowed to collect in the opening. Therefore, the bottom edge of this opening is so designed as to have a slightly inclined slope which causes these dead insects to drop to the ground by themselves as the pile of insects reaches a specific height.

Figure 2:
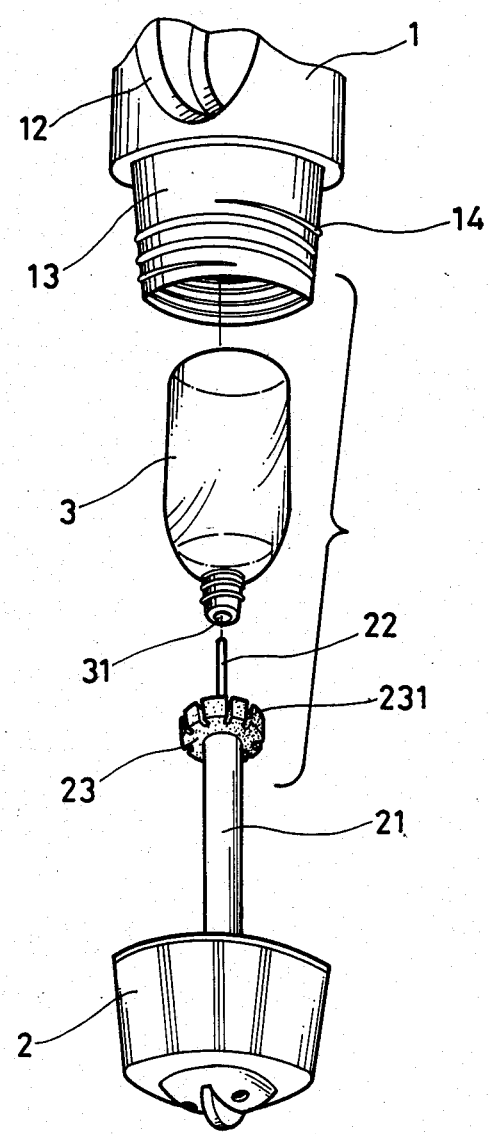
FIG. 2 is a partial illustration of a first embodiment of this invention.

FIG. 2 shows a first embodiment of this invention. The enclosure 1 in this drawing has a ventilation opening 12 and a socket base 13 at its lower end. This socket base 13 has screw thread 14.

The inner side of the base assembly 2 in this embodiment also has screw thread which can not be seen in this drawing. The base assembly 2 can be fixed to the enclosure 1 by matching this screw thread with the screw thread 14 the on enclosure 1. At the center of the base cap 2, there is a support bar 21. Immediately above the center of this support bar 21, there is a strut 22 and at the joint between the strut 22 and support bar 21, there is a wooden base plate 23. There are several grooves 231 cut around this wooden base plate 23. Through these grooves 231, insecticide will move to the lower side of the wooden base plate 23 from its upper surface and hence spread the insecticide over the entire surface of the wooden base plate 23.

Figure 3:
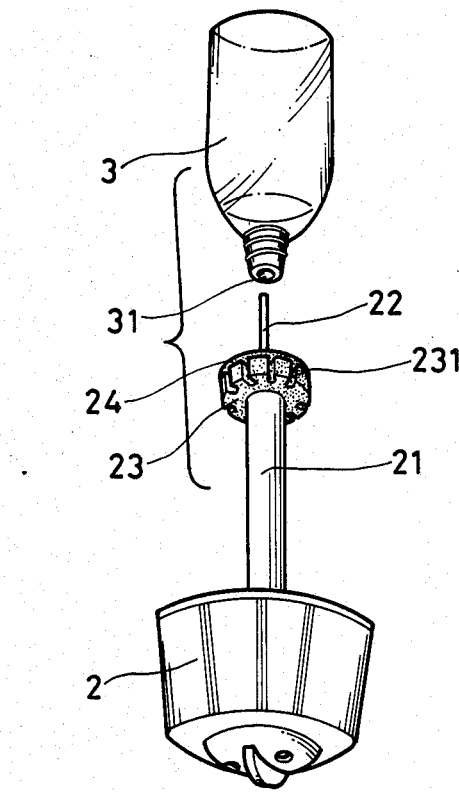
FIG. 3 is a partial illustration of a second embodiment of this invention.

Furthermore, in accordance with a second embodiment of this invention, a cotton pad 24 can be placed around the strut 22 on the base plate 23 as shown in FIG. 3. An inverted insecticide container 3 is mounted on the strut 22 in the enclosure 1 and the enclosure 1 presses the container 3 onto the cotton pad 24. After the cotton pad 24 is soaked with insecticide, the insecticide will move toward the base plate 23 from cotton pad 24 gradually. Hence, the cotton pad on the base plate will spread insecticide uniformly over the base plate, which extends the device's service life. The effective service life of the device in this way can be extended from 2-3 months to 4-5 months, both of which are much longer than the useful life of commonly used cotton pad patch, which is about 7 days.

In this embodiment, is base plate is made of cork. It also can be made of fiberous material, such as sponge, polyester, sugar cane, cotton, wood, . . . etc. These materials will spread the insecticide over the base uniformly and extend its service life substantially.

OPERATION OF THE DEVICE

First, a filled insecticide container 3 is opened in the up-side-down position and the strut 22 of the base assembly 2 is inserted into the opening 31 of the insecticide container 3. This insecticide, as is true of well-known insecticides that are used for evaporation lures, possesses some tackiness and the size of the opening 31 in the container 3 is rather small; therefore the insecticide does not flow out freely. When strut 22 is inserted into the opening 31, it is not only able to support the weight of the whole insecticide container 3, hence to stop it from falling over when the device is shaken, but it also makes the insecticide move from the strut 22 onto wooden base 23 gradually. Furthermore, there are several grooves 231 cut around the wooden base 23 to assure that the whole wooden base 23 is permeated by insecticide. The insecticide around the wooden base 23 will then evaporate gradually. After joining base assembly 2 with the enclosure 1, the device is positioned by putting a rope through the opening 11 in the enclosure 1 and then tying up the device in a convenient location. The insect luring effect is produced by this insecticide dripping process.

1. In this invention, the joining of base assembly 2 and enclosure 1 locates the base plate 23 near the upper end of the ventilation opening 12; hence, protecting the base plate from sunlight and rain. At the same time, it will provide insecticide continuously and keep the base plate moist. Thus, the service life of the insecticide therein is extended from 2 weeks to 2 months or more.

2. In this invention, the base assembly 2 and enclosure 1 have an attractive appearance.

3. When handling the dripping evaporation type device of this invention, the hands of end-users can be kept clean and free from insecticide contamination.

4. In this invention, the base assembly 2 and enclosure 1 provide good protection from insects without having any of the defects of commonly used cotton pad and prevent bodily contact with insecticide caused by accident or careless insecticide usage.

5. This invention has the advantages of low cost and long service life.

6. This invention permits a free selection from among all kinds of insecticides to kill the different insect species, such as mosquito, flies, etc.

7. After using up the insecticide, end-users can simply change to another bottle of insecticide. It is very easy to reuse this device.

I claim:

1. A dripping evaporation-type of insect luring device comprising:
   an enclosure adapted to be hung by a rope for hanging the device;
   a ventilation opening in said enclosure to facilitate the dispersal of vapors to lure the insect into the device;
   an insecticide container with air opening at one end; and
   a base assembly including
      a strut disposed at an upper portion of said base assembly extending loosely into, and holding said insecticide container in an open end down position,
      a base plate with grooves therein constructed so as to support the weight of said insecticide container and to spread the insecticide from said strut through the grooves around the base plate over the surface of the base plate so that the smell of the insecticide will then be spread by the evaporation of the insecticide from the base plate; and
      a support bar attached to said base plate and strut for supporting said insecticide container at a position within said enclosure.

2. The dripping evaporation type of insect luring device as claimed in claim 1, further comprising a fiber pad on said base plate to facilitate the spread of the insecticide onto said base plate through the fiber pad so that insecticide spreads over the base plate uniformly, whereby the service life of the device is extended.

3. The dripping evaporation type of insect luring device as claimed in claim 1 wherein the material of the base plate is made of a fiberous material such as sponge, polyester, sugar cane, cotton or wood.

4. The dripping evaporation type insect luring device as claimed in claim 1 wherein the lower edge of said ventilation opening slopes downward toward the outside of said enclosure.

5. The dripping evaporation type of insect luring device as claimed in claim 4 wherein said base plate is made of cork.

* * * * *